5 Sheets--Sheet 1.

SAMUEL H. RANSOM & BENJAMIN BURTON.
Stove-Grate.

No. 127,795. Patented June 11, 1872.

Witnesses. Inventors.

5 Sheets--Sheet 2.

SAMUEL H. RANSOM & BENJAMIN BURTON.
Stove-Grate.

No. 127,795. Patented June 11, 1872.

Witnesses. Inventors.

5 Sheets--Sheet 3.

SAMUEL H. RANSOM & BENJAMIN BURTON.
Stove-Grate.

No. 127,795.  Patented June 11, 1872.

Witnesses.  Inventors.

5 Sheets--Sheet 4.

SAMUEL H. RANSOM & BENJAMIN BURTON.
Stove-Grate.

No. 127,795. Patented June 11, 1872.

Witnesses.
Joel R. Ransom
Jas. A. Greig

Inventors.
Saml H Ransom
Benj Burton

5 Sheets--Sheet 5.

SAMUEL H. RANSOM & BENJAMIN BURTON.
Stove-Grate.

No. 127,795. Patented June 11, 1872.

Witnesses.  Inventors.
Joel R Ransom  Sam'l H Ransom
Jas. A. Greig  Benj. Burton

UNITED STATES PATENT OFFICE.

SAMUEL H. RANSOM AND BENJAMIN BURTON, OF ALBANY, NEW YORK.

IMPROVEMENT IN STOVE-GRATES.

Specification forming part of Letters Patent No. 127,795, dated June 11, 1872.

*To all whom it may concern:*

Be it known that we, SAMUEL H. RANSOM and BENJAMIN BURTON, of the city and county of Albany and State of New York, have invented certain Improvements in Grates for burning coal, &c., in stoves, heaters, ranges, and in any kind or style of furnace to which it may be adapted, of which the following is a full and exact description, reference being had to the accompanying drawing making a part of this specification, in which—

Figure 1:
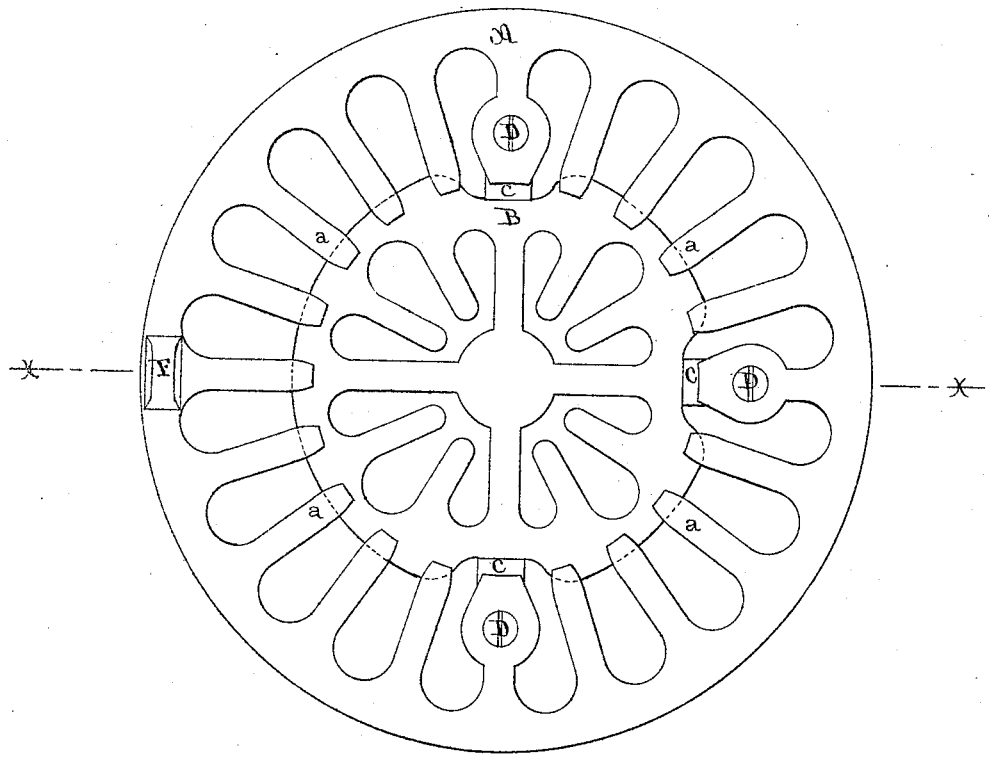
Figure 2:
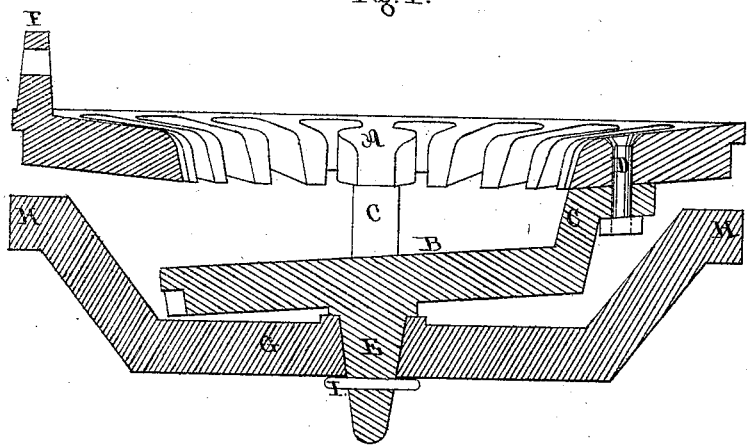

Figure 1 is a plan view; Fig. 2, a section of it through the line $x\ x$; and Figs. 3, 4, 5, 6, 7, 8, 9, and 10 are the several modifications, herein described, of which the odd-numbered figures represent the plan views, and the even numbers the front elevations of the same.

The nature of our invention consists in constructing the body of a shaking and dumping grate upon two different planes, and leaving an open space between them; the object of it being to provide a simple and ready means for the removal of the refuse portions of the fuel, which, in the process of combustion, naturally settle upon the grate, but cannot be removed by the ordinary vibrations of the grate by shaking.

The outer rim or upper section A of the grate has short bars *a a*, arranged to leave an open space in its center. These bars are made to converge toward the center of the grate, and are slightly depressed, so as to make this part of the grate a little "dishing," and the upper edges of the ends are rounded over to allow the fuel to pass freely from them. The lower section B is placed a sufficient distance beneath the upper one to form a basket or pocket for collecting the slate, clinkers, and other impurities from the fuel. The space around its periphery is left open for the purpose of removing these impurities during the process of combustion. It (the section B) is made a little larger than the open space in the upper section, so that the fuel, in settling down, may be caught by its projecting parts and retained thereon. It is provided with bars C C C for securing it to the upper section, which are so arranged as to leave the space at the front part of the grate entirely open and free for the introduction of instruments for removing the impurities of the fuel, the lower section B being fixed at a slight inclination to the section A to facilitate this removal. D D D are screws for securing together the sections A and B. E is a center-pin depending from the lower side of the section B, serving as a pivot for the grate during the operation of shaking. The ear F is provided with a hole for receiving a handle for shaking the grate. These several parts, combined and arranged together as herein described, constitute our improvement. The grate is held in the cross-bar G, which has a hole in its center for receiving the center-pin E. The extremities H H of the cross-bar are bent upward toward the upper section of the grate for the purpose of balancing it, and are rounded to form trunnions, upon which the grate swings in dumping. The pin I passes through the center-pin E, beneath the cross-bar G, and prevents the displacement of the grate.

Much difficulty has heretofore been encountered in base-burning and other stoves, where a continuous fire is kept, by a collection of the refuse matter from the fuel becoming deposited upon the grate, thereby greatly impeding the draught, and the removal of which could only be accomplished at the risk of extinguishing the fire. In our invention this difficulty is entirely overcome. After shaking the grate and sifting through it the ashes and finer portions of the refuse, the larger pieces, that have settled into and remain in the pocket of the grate, can be readily removed by passing a hooked poker into the opening between the upper and lower sections of the grate and drawing them out of the fire, without interfering in the least degree with the process of combustion. Or, the refuse that has settled down may be removed in the manner described before shaking the grate, in which case the burning fuel forms an arch or dome over the pocket, supported by the upper section of the grate; and upon shaking the grate this formation is broken by the motion of the upper section disturbing the fuel resting upon it, and the burning mass settles down to its place.

Our improvement can be as readily applied to a rectangular or any other form of the shaking grate as to the circular form, herein shown and described. It can also be made with the two sections cast in one piece, by reducing the diameter of the lower section so as to give sufficient "draught" in molding. The lower section may also be made solid, without the grated openings, shown in the drawing. It may also be arranged upon a plane parallel with the upper section instead of the inclined position, shown in Fig. 2.

Figure 3:
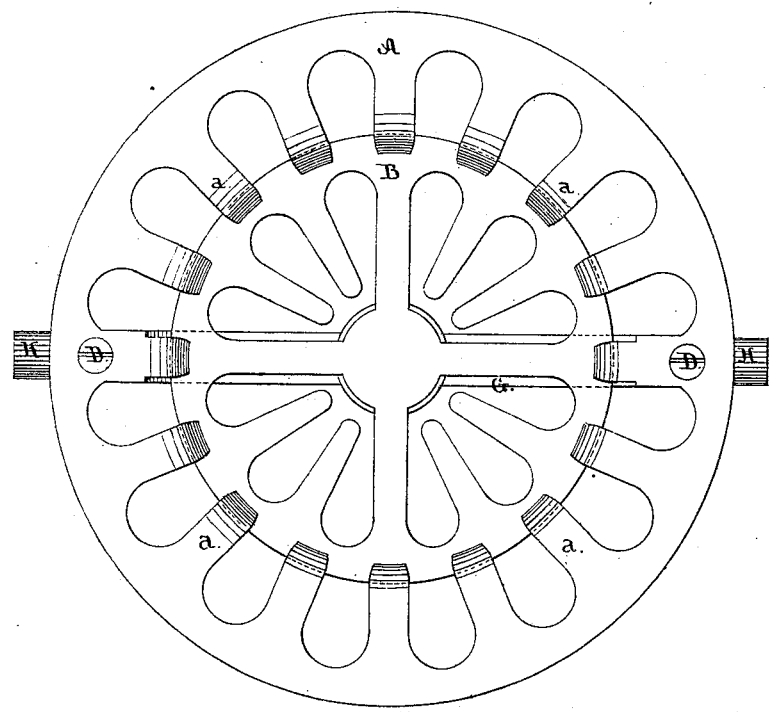
Figure 4:
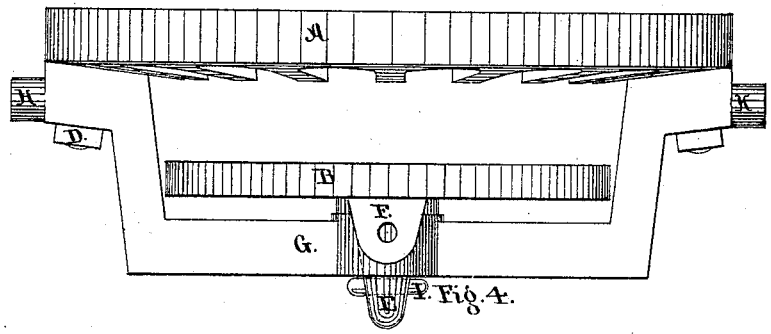

Our invention also embraces the following modifications:

First, in the construction shown in Figs. 3 and 4, in which the cross-bar G is secured to the upper section A by the screws D D, and the lower section B is retained in its position by the center-pin E. In this the shaking is effected by the lower section alone, which has an ear, F, attached to its under side for this purpose. In dumping both sections turn upon the trunnions H H.

Figure 5:
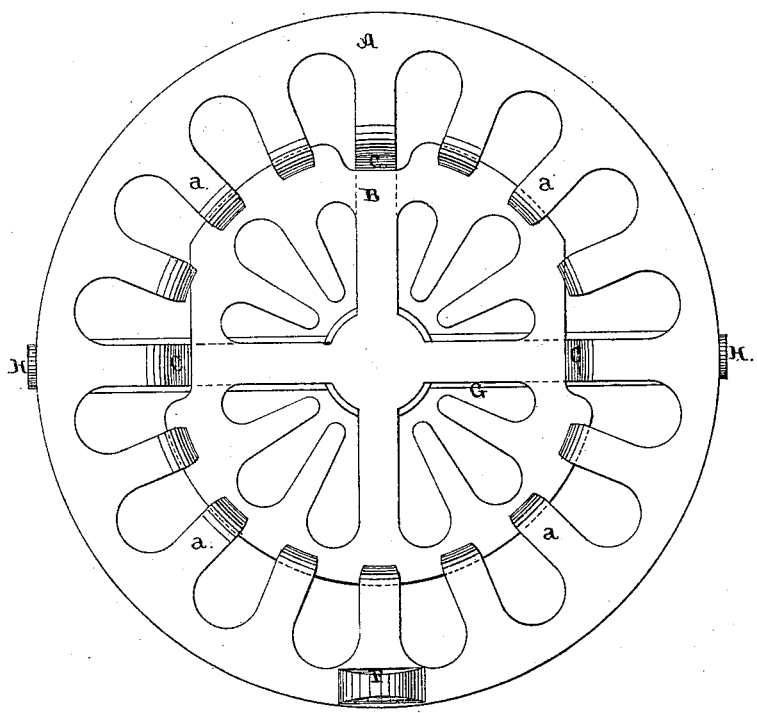
Figure 6:
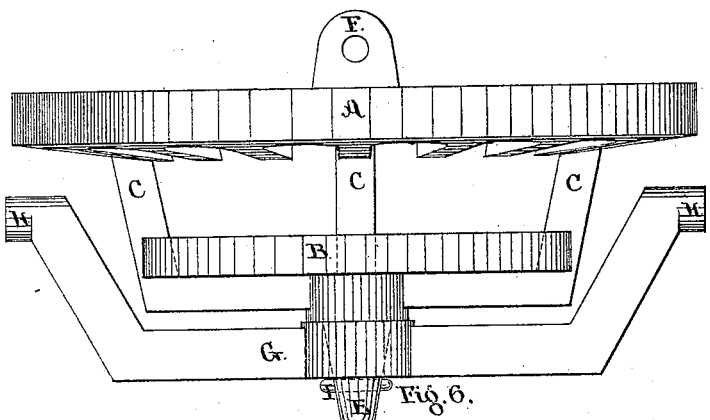

Second, in constructing it as shown in Figs. 5 and 6, in which the lower section B is made separate from the upper section A, and independently of the bars C C C, which may be cast on the upper section, and being joined together at the center form a boss for the center-pin E. In this the lower section is simply laid in its place, resting upon the bars C C C, where it vibrates with the upper section in shaking, and turns with it in dumping on the trunnions H H of the cross-bar G.

Figure 7:
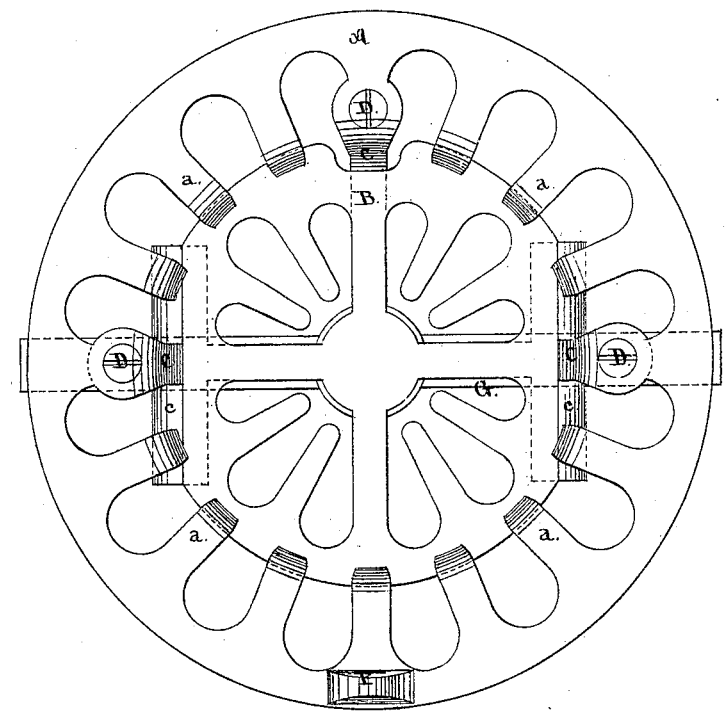
Figure 8:
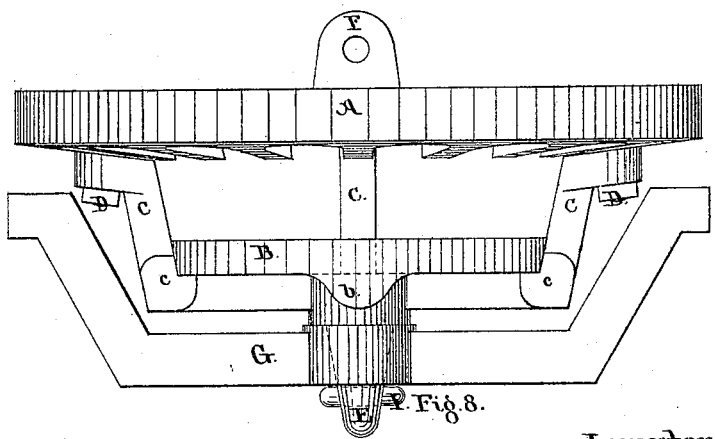

Third, in making it as shown in Figs. 7 and 8, in which the two sections vibrate together in shaking, but the dumping is effected by the lower section alone. For this purpose the upper section A is secured by the screws D D D to the bars C C C, which are joined together at the center, (from which the center-pin E depends,) and are provided with the guides $c$ $c$, in which the lower section B slides. The ear $b$ is attached to the under side of the lower section, for the purpose of drawing it out of the guides $c$ $c$ to effect the dumping. The cross-bar G is made without trunnions, and should be held securely in its place in the stove.

Figure 9:
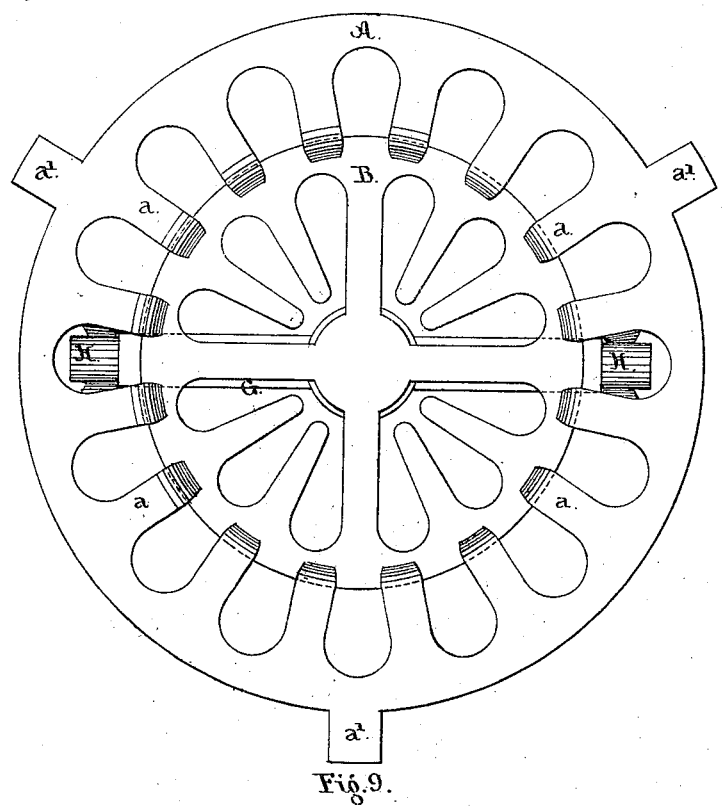
Figure 10:
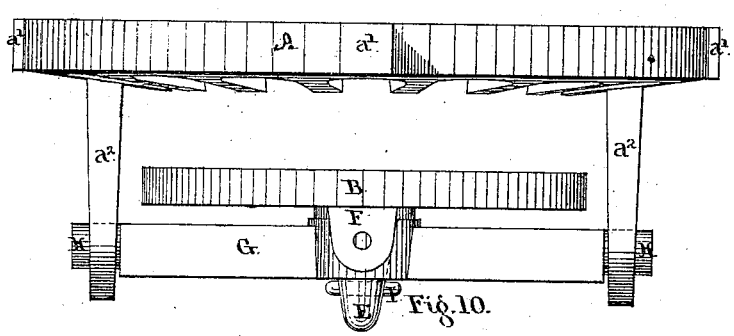

Fourth, in the construction shown in Figs. 9 and 10, in which the upper section A is held stationary during the operations of shaking and dumping by the lugs $a^1$ $a^1$ $a^1$. It also has the dependent loops $a^2$ $a^2$ attached to it for receiving the trunnions H H of the cross-bar G. The lower section B has the center-pin E and ear F attached to it, and by it the shaking and dumping are both effected.

Preferably we make them as shown in Figs. 1 and 2.

What we claim as our invention is—

A grate, consisting of the upper section A having an opening in its center, and the lower section B extending beyond such opening, when such sections are arranged upon different planes lying parallel or slightly inclined to each other and in the relative positions shown, to form an opening between them for the removal of the refuse matter from the fire, as herein described.

SAML. H. RANSOM.
BENJAMIN BURTON.

Witnesses:
 JAMES A. GREIG,
 JOEL R. RANSOM.